United States Patent
Norton

(10) Patent No.: US 10,309,237 B2
(45) Date of Patent: Jun. 4, 2019

(54) SHIELD

(71) Applicant: ROLLS-ROYCE PLC, London (GB)

(72) Inventor: Giles Daniel Norton, Bristol (GB)

(73) Assignee: ROLLS-ROYCE plc, London (GB)

(*) Notice: Subject to any disclaimer, the term of this patent is extended or adjusted under 35 U.S.C. 154(b) by 364 days.

(21) Appl. No.: 14/924,006

(22) Filed: Oct. 27, 2015

(65) Prior Publication Data
US 2016/0138409 A1    May 19, 2016

(30) Foreign Application Priority Data
Nov. 19, 2014  (GB) .................................. 1420512.4

(51) Int. Cl.
 *F04D 29/32*  (2006.01)
 *F01D 9/02*   (2006.01)
 (Continued)

(52) U.S. Cl.
CPC ................. *F01D 9/02* (2013.01); *B23P 15/04* (2013.01); *C25D 1/00* (2013.01); *C25D 1/02* (2013.01);
 (Continued)

(58) Field of Classification Search
CPC ........ F04D 29/324; F01D 5/282; F01D 5/286; F01D 5/288; F01D 5/28; F01D 5/147; F01D 9/041; F01D 9/042; F01D 9/02
See application file for complete search history.

(56) References Cited

U.S. PATENT DOCUMENTS

| 4,010,530 A | * | 3/1977 | Delgrosso .............. B23K 20/00 228/160 |
| 5,674,370 A | | 10/1997 | DuPree |

(Continued)

FOREIGN PATENT DOCUMENTS

| EP | 0 735 161 A1 | 10/1996 |
| EP | 1 995 412 A2 | 11/2008 |
| GB | 1550942 A | 8/1979 |

OTHER PUBLICATIONS

Mar. 17, 2016 Search Report issued in Eurpean Patent Application No. 15 19 1676.
(Continued)

*Primary Examiner* — Justin D Seabe
*Assistant Examiner* — Behnoush Haghighian
(74) *Attorney, Agent, or Firm* — Oliff PLC

(57) ABSTRACT

The present invention provides a method of making a metallic shield for shielding an edge of a component e.g. an aerofoil component such as a gas turbine blade or vane. The method comprises:
  providing a mandrel with a mandrel edge having a shape conforming to the shape of the component edge, wherein the mandrel edge comprises a surface having a width, W1;
  providing a metal wire having a substantially triangular radial cross-section with a base surface of width W2, wherein W2 equals W1;
  aligning and affixing the base surface of the wire on the surface of the mandrel edge;
  electro-depositing metal onto the mandrel and metal wire to form the metallic shield comprising the deposited metal and the metal wire; and
  removing the metallic shield from the mandrel.

17 Claims, 3 Drawing Sheets

(51) Int. Cl.
*C25D 1/02* (2006.01)
*B23P 15/04* (2006.01)
*F01D 5/14* (2006.01)
*C25D 1/00* (2006.01)
*F01D 5/28* (2006.01)

(52) U.S. Cl.
CPC .............. F01D 5/147 (2013.01); *F01D 5/282* (2013.01); *F01D 5/286* (2013.01); *F04D 29/324* (2013.01); *F05D 2220/36* (2013.01); *F05D 2230/30* (2013.01); *F05D 2240/121* (2013.01); *F05D 2240/303* (2013.01)

(56) References Cited

U.S. PATENT DOCUMENTS

| | | |
|---|---|---|
| 2009/0165299 A1 | 7/2009 | Cammer |
| 2013/0199934 A1* | 8/2013 | Parkos, Jr. .............. C25D 1/02 205/50 |
| 2013/0220537 A1 | 8/2013 | Parkin |
| 2016/0010468 A1* | 1/2016 | Kray ..................... B23P 15/04 415/200 |

OTHER PUBLICATIONS

Sep. 17, 2015 Search Report issued in British Patent Application No. 1420512.4.

* cited by examiner

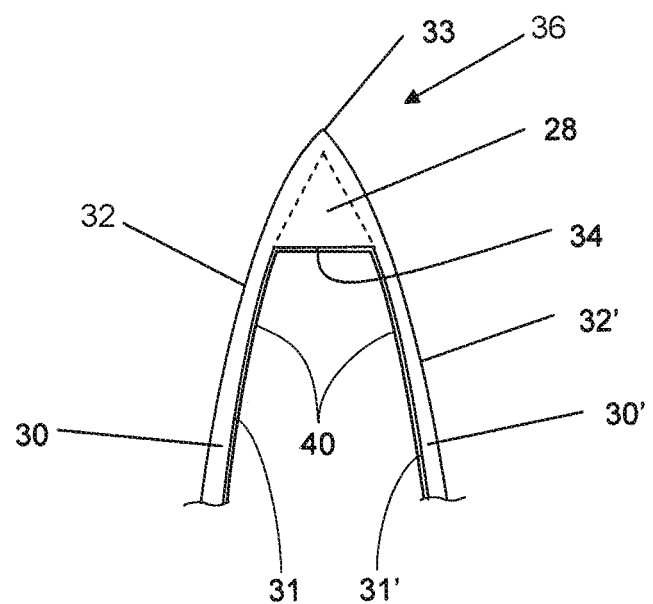

SHIELD

FIELD OF THE INVENTION

The present invention relates to a shield for an edge of a component such as an aerofoil component e.g. a blade or vane for a gas turbine engine and a method of making such a shield.

BACKGROUND OF THE INVENTION

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The high, medium and low pressure turbines 16, 17 and 18 each typically comprise a number of stages, each stage formed of a row of stator (nozzle guide) vanes and a row of rotating blades. The stator vanes are typically aerofoil-shaped and act to channel the hot gases coming from the combustion equipment 15 onto the rotating blades of the turbines 16, 17 and 18.

The stator vanes are typically formed of a composite material such as fibre-reinforced plastics material and the leading edge of each vane is typically protected from erosion and wear by bonding an electroformed metallic shield onto the composite vane to form a metallic leading edge.

Electroforming is a process that can be used to form thin metallic elements with complex curvature using electro-deposition of metal onto a mandrel. Once the deposited metal has been built up to the required thickness, the mandrel is removed to free the metallic element.

Problems arise when attempting to use electroforming to create a metallic element having a sharp, well-defined edge. In order to form such a sharp edge, the mandrel must include a corresponding sharp edge and this can be difficult to manufacture and maintain.

Furthermore, a high charge concentration tends to form at the sharp edge during electro-deposition which leads to an increase in thickness of the deposited metal. This, in turn, leads to an undesirable increase in the radius of curvature at the edge of the metallic element i.e. the edge is not sufficiently sharp/well-defined.

This effect can be reduced using careful shielding of the mandrel to prevent excessive deposition but the resulting metallic element tends to be thin at the sharp edge with a sharp internal groove (caused by the sharp edge on the mandrel). This is undesirable from a mechanical viewpoint.

There is the need for a method of electroforming a metallic element such as a shield for an aerofoil component (e.g. a stator vane) where the resulting metallic element has a sharp, well defined edge (with a small radius of curvature) without compromising mechanical strength.

SUMMARY OF THE INVENTION

In a first aspect, the present invention provides a method of making a metallic shield for shielding an edge of a component, the method comprising:
  providing a mandrel with a mandrel edge having a shape conforming to the shape of the component edge, wherein the mandrel edge comprises a surface having a width, W1;
  providing a metal wire having a substantially triangular radial cross-section with a base surface of width W2, wherein W2 equals W1;
  aligning and affixing the base surface of the wire on the surface of the mandrel edge;
  electro-depositing metal onto the mandrel and metal wire to form the metallic shield comprising the deposited metal and the metal wire; and
  removing the metallic shield from the mandrel.

In a second aspect, the present invention provides a metallic shield for shielding an edge of a component, the metallic shield having opposing walls, each wall having an inside surface for abutment with the component and an outside surface, wherein the outside surfaces of the opposing walls meet at and define a shield edge and wherein the inside surfaces of the opposing walls are mutually spaced proximal the shield edge by an internal abutment surface for abutment with the edge of the component.

In the method described above, during electro-deposition, the metal deposits over the exposed mandrel surfaces and also over the exposed metal wire surfaces to create the metallic shield which subsumes the metal wire. Accordingly, it is possible to form a metallic shield having a sharp, well-defined edge with a small radius of curvature, the shield edge being defined by the subsumed metal wire, without having to use a mandrel having a sharp edge. Mandrel manufacture and maintenance is thus facilitated.

Furthermore, after removal of the mandrel, the base surface of the subsumed wire forms an internal abutment surface of the metallic shield which spaces the inside surfaces of the opposing walls of the shield which are formed from metal deposited onto the mandrel. Providing an internal abutment surface to space the inside surfaces of the opposing walls (rather than the inside surfaces of the opposing walls extending to meet each other at an internal apex) increases the metal thickness at the shield edge (i.e. the distance from the shield edge to the internal abutment surface is greater than the distance from the shield edge to an internal apex would be) which leads to increased mechanical strength without increasing the radius of curvature of the edge.

The edge of the component will be manufactured or processed to provide a component edge surface to match the internal abutment surface. This manufacturing/processing is facilitated by the requirement to match the internal abutment surface rather than to match an internal apex.

Optional features of the invention will now be set out. These are applicable singly or in any combination with any aspect of the invention.

The term "substantially triangular" is intended to define a shape having three edges (a base edge and two side edges) and three apices. The edges may each be linear or curved. For example, the base edge (extending along the edge of the base surface of the wire) may be linear or concave and/or the two side edges (extending along the edges of the two side surfaces of the wire) may be linear or convex.

In some embodiments, the surface of the mandrel edge, the base surface of the metal wire and the internal abutment surface of the shield are planar/flat surfaces.

The internal abutment surface extends directly between the two inside surfaces (rather than having a curved profile).

In other embodiments, the surface of the mandrel edge, the base surface of the metal wire and the internal abutment surface of the shield are curved surfaces. For example, the base surface of the metal wire and the internal abutment surface may be concave and the surface of the mandrel edge may be convex.

In some embodiments, the side surfaces of the metal wire (extending from the base surface and meeting each other at an apex) may be convex.

In some embodiments, the angle between the internal abutment surface and each inside surface of the opposing wall is between 90 and 135 degrees.

In some embodiments of the method, the surface of the mandrel edge has a length, L1 and the metal wire has a length L2, wherein L2 is equal to or greater than L1. The metal wire can be processed (e.g. trimmed) prior to alignment and fixing of the base surface to the surface of the mandrel edge or after electrodeposition so that the length of the wire matches the length of the surface of the mandrel edge.

The term "radial cross-section" is intended to refer to the cross-section through the wire perpendicular to the length (e.g. L2) of the wire.

In some embodiments of the method, the metal wire may comprise an outer surface with a conductive coating.

In some embodiments of the method, the metal wire or the conductive coating is formed of nickel or nickel cobalt alloy. The conductive coating may alternatively be carbon black.

In some embodiments of the method, the deposited metal has substantially the same chemical identity as the metal wire. For example the deposited metal may be nickel.

In some embodiments of the method, the metal wire is affixed to the surface of the mandrel edge by adhesive. In some embodiments, the surface of the mandrel edge is provided with permanent magnets which are subsequently used to affix the base surface of the metal wire to the surface.

In some embodiments of the shield, the thickness of the opposing walls distal the shield edge is typically around 0.125 mm.

In some embodiments, the component is an aerofoil component e.g. a blade or a vane. The edge of the component may be the leading edge of the aerofoil component. The opposing walls may at least partly cover/clad the pressure and suction surfaces of the aerofoil component.

In a third aspect, the present invention provides a method of forming an aerofoil component, the method comprising forming a metallic shield using the method of the first aspect and affixing the metallic shield to the edge of the component.

In a fourth aspect, the present invention provides a method of forming an aerofoil component, the method comprising affixing a metallic shield according to the second aspect to the edge of the component with the inside surfaces of the opposing walls abutting the pressure and suctions surfaces of the aerofoil component.

In a fifth aspect, the present invention provides an aerofoil component having a pressure surface, a suction surface and an edge surface, the edge surface extending between the pressure and suction surfaces, wherein the aerofoil component further comprises a metallic shield having opposing walls, each wall having an inside surface in abutment with one of the pressure or suction surfaces and an outside surface, the outside surfaces of the opposing walls meeting at and defining a shield edge and the inside surfaces of the opposing walls being mutually spaced proximal the shield edge by an internal abutment surface which is in abutment with the edge surface of the component.

In a sixth aspect, the present invention provides a gas turbine engine comprising an aerofoil component according to the fifth aspect or formed according to the third or fourth aspects.

BRIEF DESCRIPTION OF THE DRAWINGS

Embodiments of the invention will now be described by way of example with reference to the accompanying drawings in which:

FIG. 4 shows a stator vane of an aerofoil component having a metallic shield according to an embodiment of the present invention.

DETAILED DESCRIPTION AND FURTHER OPTICAL FEATURES OF THE INVENTION

Figure 1:
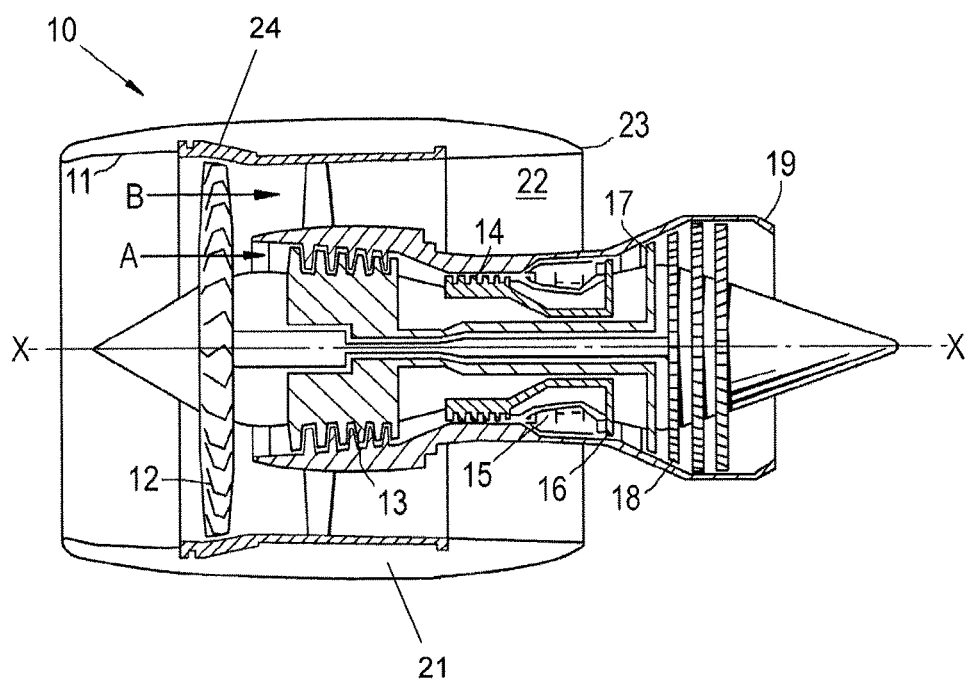
FIG. 1 shows a ducted fan gas turbine engine.
Figure 2:
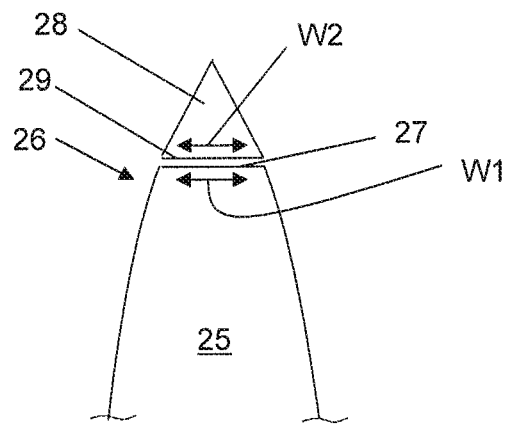
FIG. 2 shows a mandrel and metal wire for use in a method according to an embodiment of the present invention.

As discussed above, a ducted fan gas turbine engine as shown in FIG. 1 has high, medium and low pressure turbines 16, 17 and 18 each typically comprising a number of stages, each stage formed of a row of stator (nozzle guide) vanes and a row of rotating blades.

The stator vanes are typically formed of a composite material such as fibre-reinforced plastics material and the leading edge of each vane is typically protected from erosion and wear by bonding an electroformed metallic shield onto the composite vane to form a metallic leading edge.

One embodiment of the present invention provides a method of forming such a metallic shield for a stator vane.

The method comprises providing a stainless steel mandrel 25 with a mandrel edge 26. The mandrel edge 26 has a shape conforming to the shape of the leading edge of the stator vane. The mandrel edge 26 comprises a planar surface 27 having a width, W1.

Next, the method comprises providing a nickel or nickel/cobalt alloy wire 28 having a substantially triangular radial cross-section (i.e. the cross-section perpendicular to the axial extension of the wire) with a planar base surface 29 of width W2. The width W1 of the edge surface 27 of the mandrel 25 matches the width W2 of the base surface 29 of the nickel (alloy) wire 28.

The surface 27 of the mandrel edge 26 has a length, L1 and the nickel (alloy) wire is trimmed to have a matching length L2.

The base surface 29 of the nickel (alloy) wire 28 is aligned with and then affixed to the surface 27 on the mandrel edge 26. This affixing may be achieved using adhesive or using permanent magnets provided on the surface 27 of the mandrel edge 26.

Figure 3:
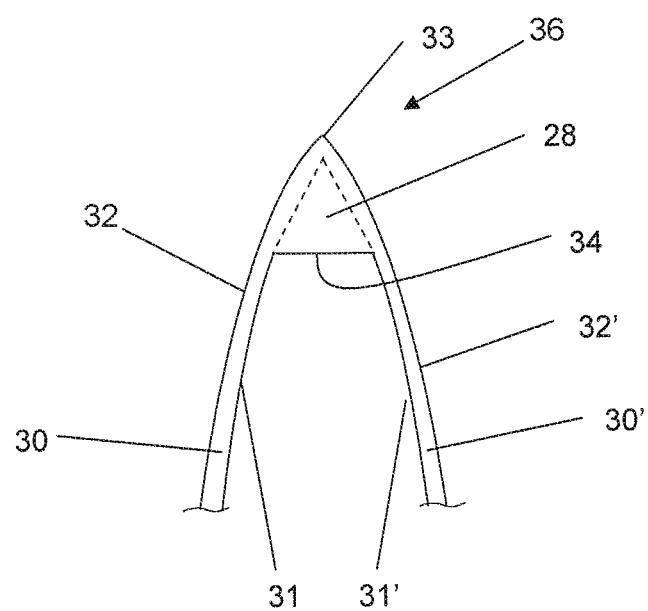
FIG. 3 shows a metallic shield according to an embodiment of the present invention.

The mandrel 25 and affixed nickel (alloy) wire 28 are connected to an anode and submerged in an electrolytic solution which further contains a nickel metal cathode. Electroforming is carried out in the known manner to electro-deposit nickel onto the exposed surfaces of the mandrel 25 and nickel (alloy) wire 28 to form the metallic shield 36 which subsumes the nickel (alloy) wire as shown in FIG. 3. The metallic shield 36 is subsequently removed from the mandrel 25.

The metallic shield 36 has opposing walls 30, 30', each wall having a thickness of around 0.125 mm with an inside surface 31, 31' for abutment with the pressure/suction surfaces of the stator vane 40 (FIG. 4). The opposing walls 30, 30' also each have an outside surface 32, 32', which meet at and define a shield edge 33. The inside surfaces 31, 31' of the opposing walls 30, 30' are mutually spaced proximal the shield edge 33 by a planar internal abutment surface 34 for abutment with the leading edge of the stator vane 40. The internal abutment surface 34 is formed from the base surface 29 of the subsumed wire 28.

Providing an internal abutment surface 34 to space the inside surfaces 31, 31' of the opposing walls 30, 30' increases the metal thickness at the shield edge 33 which leads to increased mechanical strength without increasing the radius of curvature of the edge 33.

Instead, the metallic shield 36 has a sharp, well-defined shield edge 33 with a small radius of curvature, the shield edge being defined by the subsumed nickel (alloy) wire 28. This shield edge 33 is formed without having to use a mandrel 25 having a sharp edge. Mandrel manufacture and maintenance is thus facilitated.

The metallic shield 36 is affixed e.g. using adhesive to the leading edge of the stator vane 40, the leading edge of the stator vane 40 having been manufactured or processed so that it has a surface matching the internal abutment surface 34. The opposing walls 30, 30' will abut the pressure and suction surfaces of the stator vane 40.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

The invention claimed is:

1. A method of making a metallic shield for shielding an edge of a component, the method comprising:
   providing a mandrel with a mandrel edge having a shape conforming to the shape of the component edge, wherein the mandrel edge comprises a surface having a width, W1;
   providing a metal wire having a substantially triangular radial cross-section with a base surface of width W2, wherein W2 equals W1;
   aligning and affixing the base surface of the wire on the surface of the mandrel edge;
   electro-depositing metal onto the mandrel and metal wire to form the metallic shield comprising the deposited metal and the metal wire; and
   removing the metallic shield from the mandrel, wherein the metallic shield comprises an electroplated shield comprising opposing walls, each wall having an inside surface for abutment with the component and an outside surface, wherein the outside surfaces of the opposing walls meet at and define a shield edge, and
   the electroplated shield covers all surfaces of the wire except an internal abutment surface of the wire that is configured for direct abutment with the edge of the component.

2. A method according to claim 1 wherein the metal wire has a radial cross-section with a linear or concave base edge and/or two linear or convex side edges.

3. A method according to claim 1 wherein the surface of the mandrel edge has a length, L1 and the metal wire has a length L2, wherein L2 is equal to or greater than L1.

4. A method according to claim 1 wherein the metal wire comprises an outer surface with a conductive coating.

5. A method according to claim 1 wherein the metal wire or the conductive coating is formed of nickel or nickel/cobalt alloy.

6. A method according to claim 5 wherein the deposited metal is nickel.

7. A method of forming an aerofoil component, the method comprising forming a metallic shield using the method according to claim 1 and affixing the metallic shield to the edge of the aerofoil component.

8. A metallic shield for shielding an edge of a component, the metallic shield comprising:
   an electroplated shield comprising opposing walls, each wall having an inside surface for abutment with the component and an outside surface, wherein the outside surfaces of the opposing walls meet at and define a shield edge; and
   wherein the electroplated shield covers all surfaces of a wire except an internal abutment surface of the wire that is configured for direct abutment with the edge of the component.

9. The metallic shield according to claim 8 wherein the base surface of the shield is a planar surface.

10. An aerofoil component comprising the metallic shield according to claim 8 at the leading edge of the aerofoil component with the opposing walls at least partly covering pressure and suction surfaces of the aerofoil component.

11. An aerofoil component having a pressure surface, a suction surface, and an edge surface, the edge surface extending between the pressure and suction surfaces, wherein the aerofoil component further comprises a unitary metallic shield comprising:
   an electroformed shield having opposing walls, each opposing wall having (1) an inside surface in abutment with one of the pressure or suction surfaces and (2) an outside surface, the outside surfaces of the opposing walls of the unitary metallic shield directly contacting each other and defining a shield edge; and
   wherein surfaces abutting the opposing walls and longitudinal ends of a wire are covered by the electroformed shield, the wire comprising an internal abutment surface which is configured to abut the edge surface of the aerofoil component.

12. A gas turbine engine comprising the aerofoil component according to claim 10.

13. A gas turbine engine comprising the aerofoil component according to claim 11.

14. The metallic shield according to claim 8 wherein the wire has a triangular radial cross-section.

15. The aerofoil component according to claim 11, wherein the wire has a triangular radial cross-section.

16. A metallic shield for shielding an edge of a component, the metallic shield comprising:
- a wire comprising two end surfaces positioned at opposing ends of a longitudinal length of the wire and a base surface; and
- an electroformed covering subsuming the wire such that the two end surfaces of the wire are completely covered by the electroformed covering while the base surface is not covered by the electroformed portion, each wall having an inside surface for abutment with the component and an outside surface, wherein the opposing walls have a constant thickness from one end of the metallic shield to a point where the opposing walls meet at and define a shield edge, wherein
- the inside surfaces of the opposing walls are separated at the shield edge by the wire, and
- the base surface being configured for abutment with the edge of the component.

17. The metallic shield according to claim 16 wherein each of the opposing walls have a curvature from the shield edge to the one end of the metallic shield.

\* \* \* \* \*